(12) United States Patent
Kadoike et al.

(10) Patent No.: US 9,473,004 B2
(45) Date of Patent: Oct. 18, 2016

(54) DRIVE DEVICE AND ELECTRIC POWER STEERING DEVICE INCLUDING THE DRIVE DEVICE

(71) Applicant: DENSO CORPORATION, Kariya, Aichi-pref. (JP)

(72) Inventors: Yuuta Kadoike, Kariya (JP); Hideki Kabune, Nagoya (JP); Hiroyuki Kawata, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/812,769

(22) Filed: Jul. 29, 2015

(65) Prior Publication Data
US 2016/0036303 A1    Feb. 4, 2016

(30) Foreign Application Priority Data

Jul. 31, 2014  (JP) ................................ 2014-156480

(51) Int. Cl.
| | |
|---|---|
| *H02K 1/32* | (2006.01) |
| *H02K 9/22* | (2006.01) |
| *B62D 5/04* | (2006.01) |
| *H02K 11/00* | (2016.01) |

(52) U.S. Cl.
CPC ............... *H02K 9/22* (2013.01); *B62D 5/0412* (2013.01); *H02K 11/0068* (2013.01); *H02K 11/33* (2016.01)

(58) Field of Classification Search
CPC ........ H02K 11/33; H02K 5/225; H02K 5/18; H02K 5/04
USPC ............................ 310/64, 89, 71, 68 R, 68 D
See application file for complete search history.

(56) References Cited

U.S. PATENT DOCUMENTS

| | | | | |
|---|---|---|---|---|
| 2003/0117030 A1* | 6/2003 | Agnes | ................... | H02K 1/185 310/89 |
| 2006/0158049 A1* | 7/2006 | Suzuki | ................... | H02K 11/33 310/52 |
| 2007/0063603 A1* | 3/2007 | Levine | .................. | D06F 37/206 310/85 |
| 2011/0018374 A1 | 1/2011 | Yamasaki et al. | | |
| 2011/0254388 A1* | 10/2011 | Yamasaki | ............ | B62D 5/0406 310/43 |
| 2011/0254393 A1* | 10/2011 | Yamasaki | .............. | H02K 11/33 310/64 |

(Continued)

OTHER PUBLICATIONS

U.S. Appl. No. 14/812,415, filed Jul. 29, 2015, Yamasaki, et al.
U.S. Appl. No. 14/812,757, filed Jul. 29, 2015, Yamasaki, et al.

(Continued)

*Primary Examiner* — Thanh Lam
(74) *Attorney, Agent, or Firm* — Knobbe, Martens, Olson & Bear, LLP

(57) ABSTRACT

A drive device that includes a motor having a rotor disposed relative to a stator, a cover having a one-end-closed cylinder shape and positioned on one axial end side of the motor, and a substrate on the inside of the cover perpendicular to a motor shaft having electronic components implemented on the substrate. The drive device also includes a connector positioned on a motor side of the substrate with an opening that is connectable to an external terminal. The opening of the connector faces outward relative to the motor shaft. The drive device further includes a heat sink having a frame end part and a heat receiving part formed in one body. The drive device increases heat capacity of the heat sink without increasing its height.

10 Claims, 8 Drawing Sheets

(56) References Cited

U.S. PATENT DOCUMENTS

| | | | |
|---|---|---|---|
| 2011/0285225 A1* | 11/2011 | Matsuda | B62D 5/0406 310/64 |
| 2012/0098361 A1 | 4/2012 | Yamasaki et al. | |
| 2012/0098365 A1 | 4/2012 | Yamasaki et al. | |
| 2012/0098366 A1 | 4/2012 | Yamasaki et al. | |
| 2012/0104886 A1 | 5/2012 | Yamasaki et al. | |
| 2014/0153198 A1 | 6/2014 | Yamasaki | |

OTHER PUBLICATIONS

U.S. Appl. No. 14/812,886, filed Jul. 29, 2015, Yamasaki.
U.S. Appl. No. 14/812,866, filed Jul. 29, 2015, Kawata, et al.
U.S. Appl. No. 14/812,807, filed Jul. 29, 2015, Kawata, et al.
U.S. Appl. No. 14/812,753, filed Jul. 29, 2015, Kabune.
U.S. Appl. No. 14/812,733, filed Jul. 29, 2015, Yamasaki, et al.
U.S. Appl. No. 14/812,767, filed Jul. 29, 2015, Hayashi.

* cited by examiner

DRIVE DEVICE AND ELECTRIC POWER STEERING DEVICE INCLUDING THE DRIVE DEVICE

CROSS REFERENCE TO RELATED APPLICATION

The present application is based on and claims the benefit of priority of Japanese Patent Application No. 2014-156480, filed on Jul. 31, 2014, the disclosure of which is incorporated herein by reference.

TECHNICAL FIELD

The present disclosure generally relates to a drive device and an electric power steering device including the drive device.

BACKGROUND INFORMATION

Conventionally, a drive device used for the electric power steering device with which the steering operation by a driver is assisted has a one-body structure, in which the motor and the motor controller are combined in one body.

The controller for the drive device disclosed in a patent document, JP 2011-176998 A (Patent document 1) has two substrates that are disposed perpendicularly to the rotation axis of the rotor of the motor (a motor shaft) and a heat sink disposed in between the two substrates. The outer wall of the heat sink has a power module attached thereto at a part of the outer wall that is in parallel with the motor shaft, and the power module molds multiple switching elements to be serving as an inverter circuit. Therefore, the drive device has a heat dissipation capability, dissipating heat of the power module to the heat sink at the power module operation time.

However, the controller making up the drive device of the patent document 1 has two substrates, thereby having an increased dimension along the motor shaft due to the thickness of the electronic components and the substrate supporting those components. Further, the power module is attached on the outer wall of the heat sink that is disposed in parallel with the motor shaft, which creates an excess unoccupied space inside the cup-shape motor cover due to the square shape of the power module.

SUMMARY

It is an object of the present disclosure to provide a drive device that has a smaller volume along the motor shaft, and an electric power steering device using such a drive device.

In one aspect of the present disclosure, a drive device includes a motor having a rotor that is located relative to a stator, a cover having a one-end-closed cylinder shape and positioned on one axial end side of the motor, and a substrate on the Inside of the cover perpendicular to a motor shaft having electronic components implemented on the substrate to control an electric current supplied to the motor.

The drive device also includes a connector positioned on a motor side of the substrate with an opening that is connected to an external terminal. The opening of the connector faces outward relative to the motor shaft.

The drive device further includes a heat sink having a frame end part and a heat receiving part formed in one body to absorb heat from the electronic components implemented on the substrate. The frame end part covers a substrate side of the stator and the rotor, and the heat receiving part Is positioned radial inside of the connector, relative to the motor shaft, when viewed at a direction through the motor shaft, and rising from the frame end part toward the substrate, when viewed at a direction perpendicular to the motor shaft.

In such manner, the connector, which is a relatively large component among many components making up the controller for controlling the motor, is positioned on the motor side of the substrate. Further, the heat sink is capable of providing a large heat capacity by having a one body structure in which the frame end part and the heat receiving part are combined in one body and the heat receiving part is positioned at a radial inside of the connector. Therefore, no excess unoccupied space is created inside the cup-shape cover that covers the substrate and the smaller volume drive device is constructed by reducing the along-motor-shaft dimension thereof.

In another aspect of the present disclosure, an electric power steering device having the drive device is devised. When the drive device is reduced in volume, the electric power steering device has an improved installability in a vehicle.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described based on the drawings.

First Embodiment

The first embodiment of the present disclosure is shown in FIG. 1 to FIG. 6. A drive device 1 of the present embodiment is used in an electric power steering device 2 of a vehicle.

Figure 1:
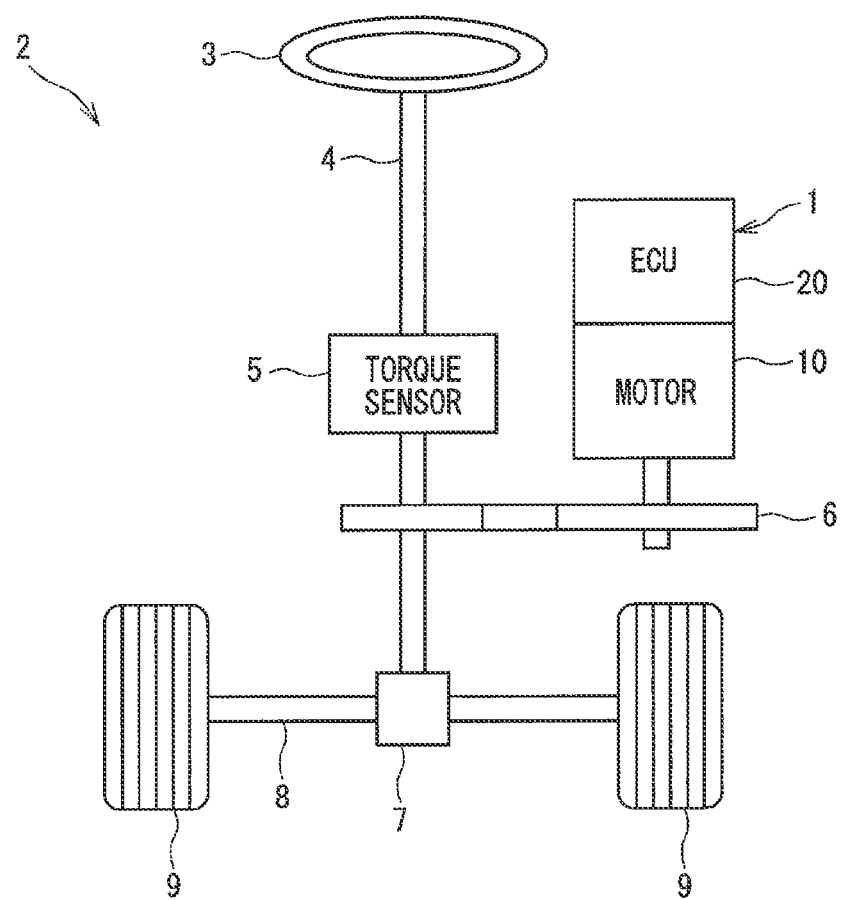
FIG. 1 is an illustrative diagram of an electric power steering device that uses a drive device in a first embodiment of the present disclosure.
Figure 2:
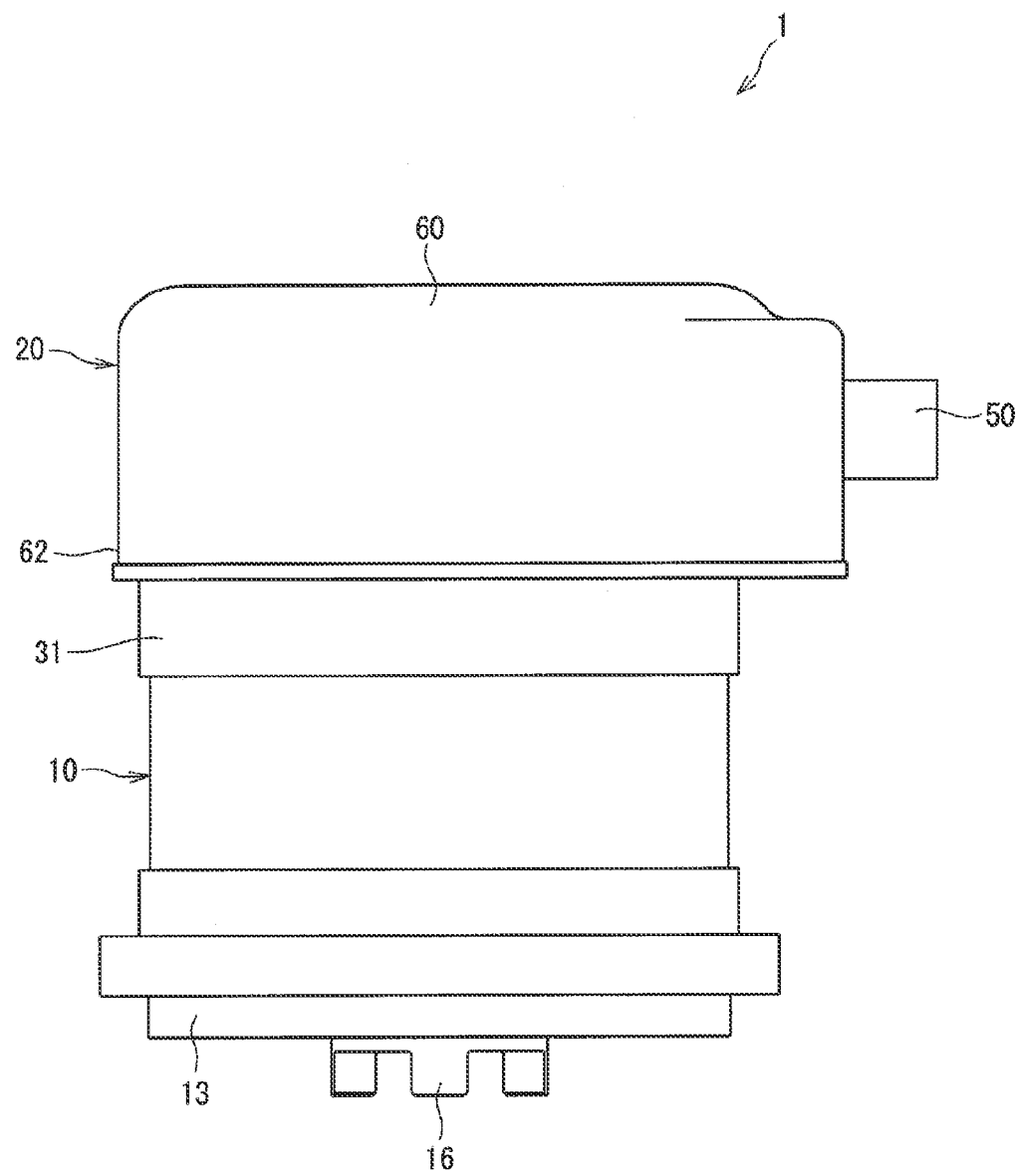
FIG. 2 is a side view of the drive device in the first embodiment of the present disclosure.

As shown in FIG. 1, in the electric power steering device 2, the drive device outputs an assist torque for steering wheel operation based on various signals, such as a signal obtained from a torque sensor 5 that detects a torque produced in a column shaft 4 by an operation of a driver for rotating a steering wheel 3, and a signal regarding travel speed information obtained from a Controller Area Network (CAN) of the vehicle, for example. The assist torque from the drive device 1 is transmitted to a column shaft 4 through a speed reduction gear 6. A rotational movement of the column shaft 4 is converted to a straight movement of a rack shaft 8 by a pinion gear 7. A steering wheel 9 is steered according to the amount of displacement of the rack shaft 8.

The column shaft 4, the pinion gear 7, the rack shaft 8 and the like correspond to "a power transmission mechanism transmitting power between a steering wheel and a steered wheel."

As shown in FIG. 2 to FIG. 5, the drive device 1 has a one-body structure in which a motor 10 and a controller 20 for controlling the motor 10 are combined to have one body. The controller 20 is disposed on an opposite side relative to an output end 16 of the motor 10. When the drive device 1 is installed in the vehicle, the motor 10 comes to a lower side in the vertical direction, and the controller 20 comes to an upper side in the vertical direction, i.e., relative to Earth.

Figure 5:
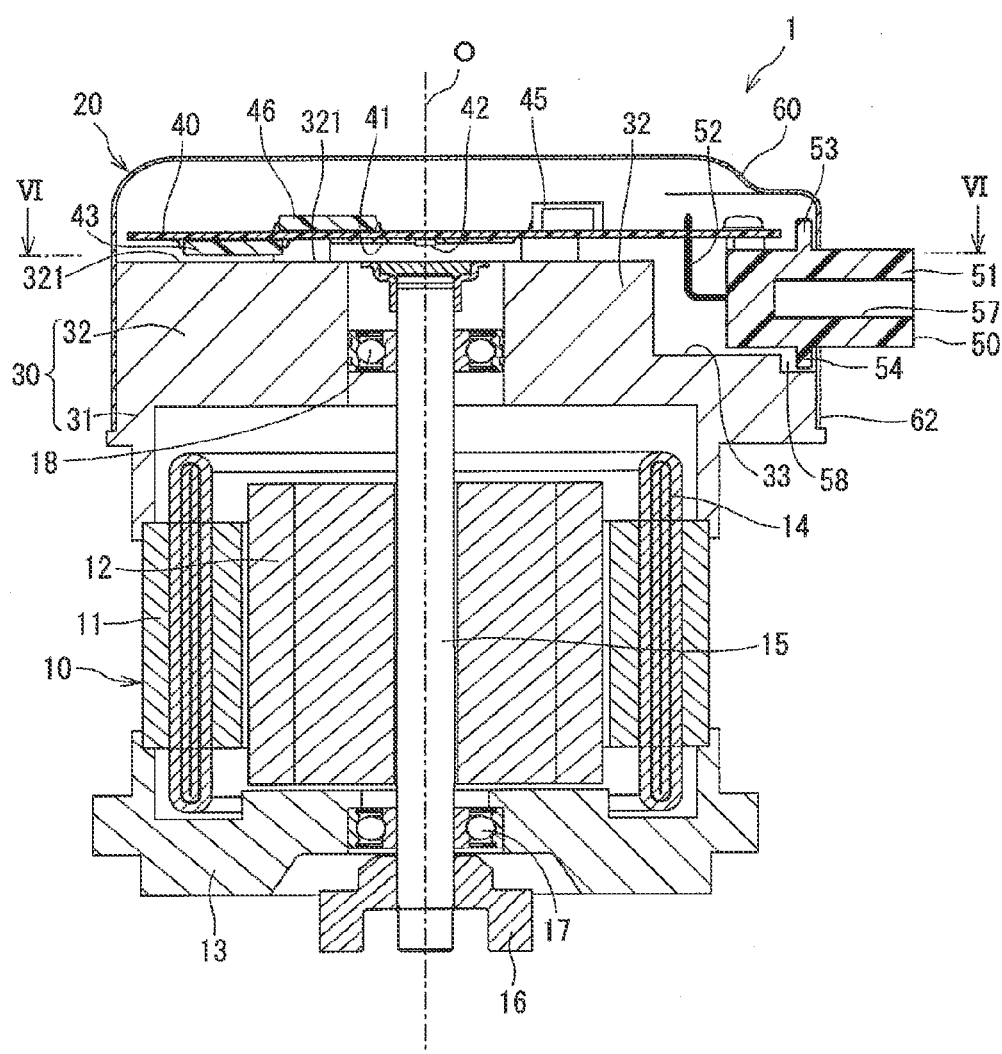
FIG. 5 is a sectional view of the drive device along a V-V line in FIG. 4.

As shown in FIG. 5, the motor 10 is a brushless motor, for example, and is provided with a stator 11 and a rotor 12. The stator 11 is formed in a cylindrical shape with a magnetic body, and is supported by a front frame end 13 on one axial end, and is supported by a frame end part 31 on the other axial end. The frame end part 31 is a part of a heat sink 30 provided for the controller 20, which is described later.

The stator 11 has a coil 14 wound on a slot. The rotor 12 is formed in a cylindrical shape with a magnetic body, and is positioned at a radial inside of the stator 11. By "radial inside," it is meant that the rotor 12 is formed inside of the stator 11, where a radius of the rotor 12 from the rotor 12 to a motor shaft O less than a radius of the stator 11 from the stator 11 to the motor shaft O, when viewing through the motor shaft O. The rotor 12 is rotatable relative to the stator 11. A shaft 15 of the rotor 12 is rotatably supported by a bearing 17 of a front frame end 13 on one end, and is rotatably supported by a bearing 18 of a frame end part 31 on the other end.

The stator 11 in the motor 10 generates a rotating magnetic field when an electric power is supplied to the coil 14 from the controller 20, and the rotor 12 and the shaft 15 rotate about the shaft according to such magnetic field.

Figure 3:
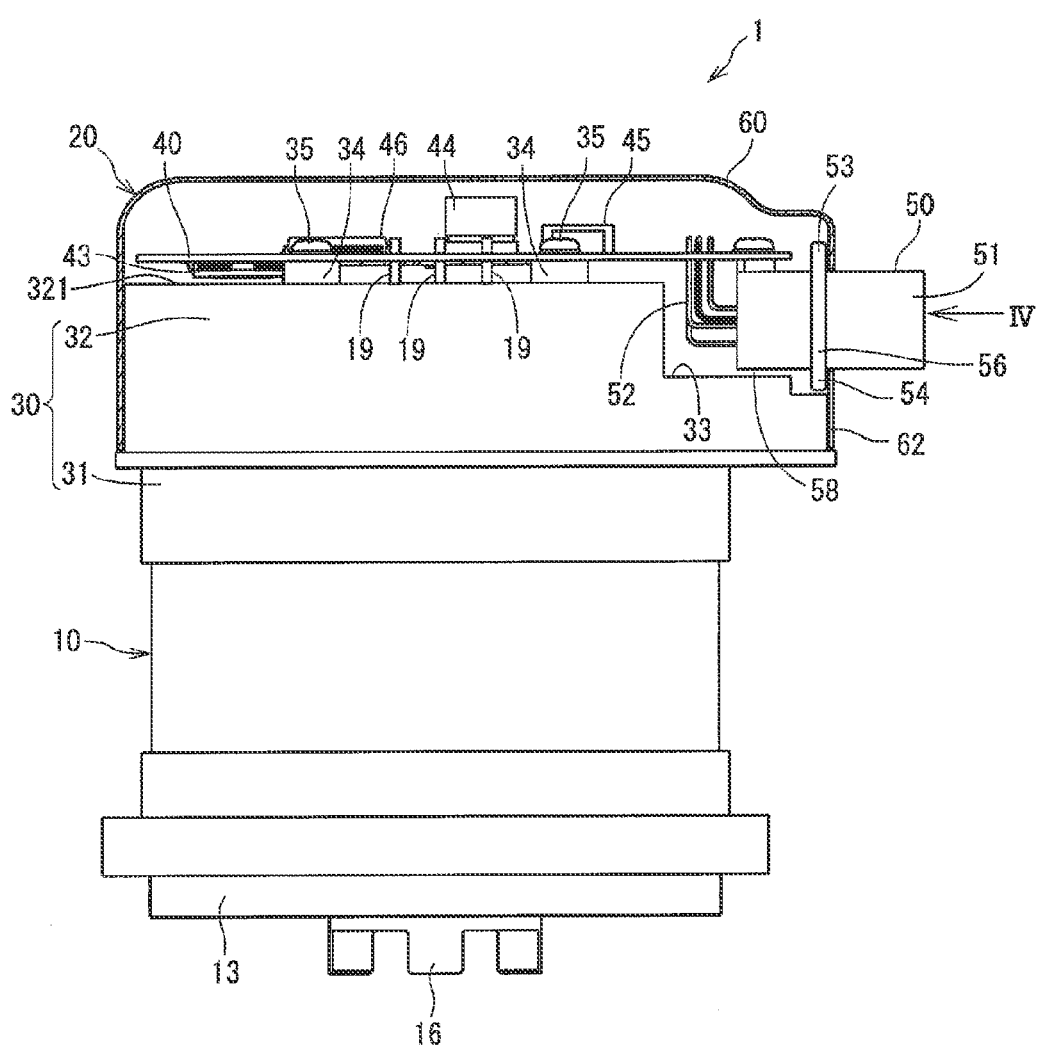
FIG. 3 is another side view of the drive device in which a part of a cover is removed from FIG. 2.
Figure 4:
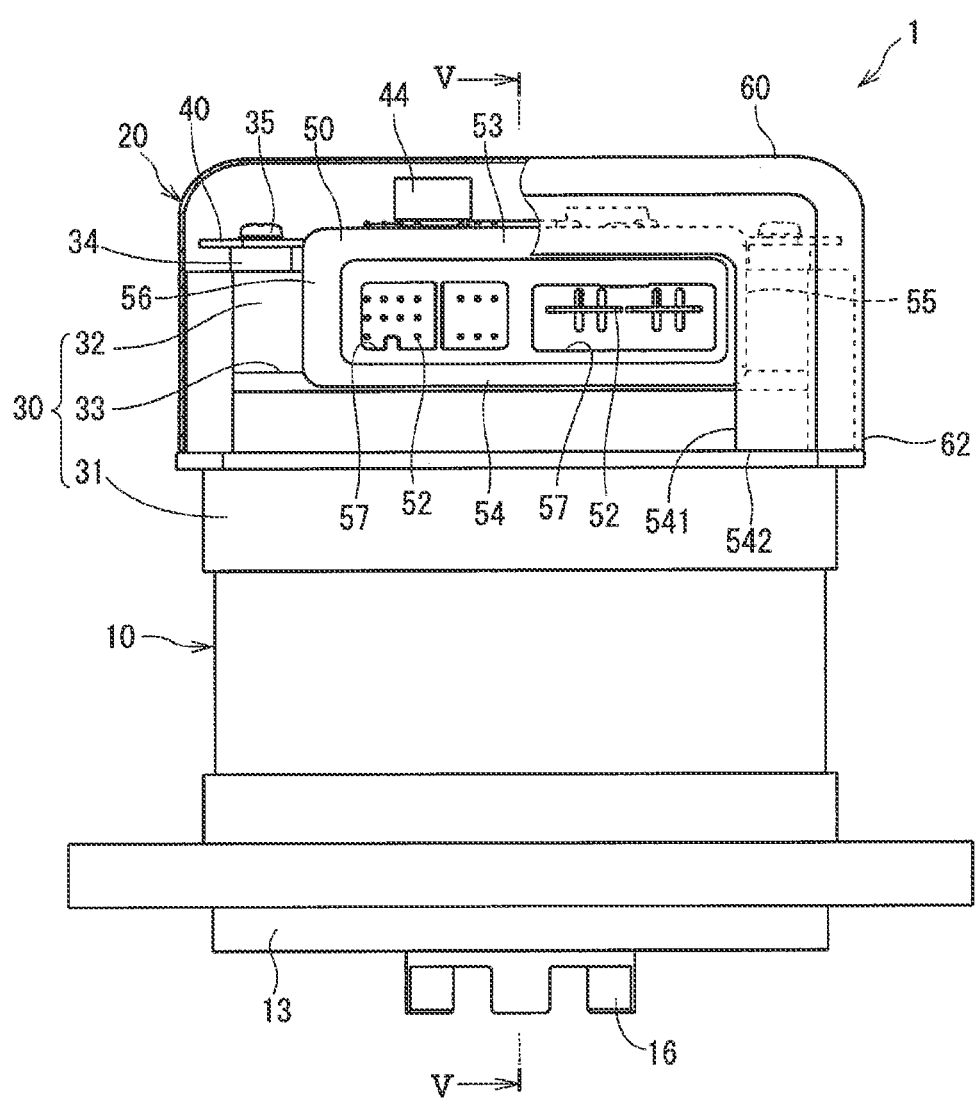
FIG. 4 is yet another side view of the drive device along an arrow III in FIG. 3, in which a part of the cover is removed from FIG. 3.

As shown in FIG. 3 to FIG. 5, the controller 20 has the heat sink 30 that is Integrally formed with the frame end part 31, a substrate 40 disposed on an away side of the heat sink 30 relative to the motor 10, and other parts. The motor side of the substrate 40 has a connector 50 attached to the substrate 40. Further, the heat sink 30 and the substrate 40 are protected by a cover 60 having a cup-shape, i.e., a cylindrical and bottom-closed shape.

The heat sink 30 has a one body structure, combining the frame end part 31 that covers a substrate side of the stator 11 and the rotor 12 and the heat receiving part 32 that extends from the frame end part 31 toward the substrate 40. The heat sink 30 is formed by casting or cutting, for example, with a material such as aluminum etc. The heat sink 30 serves as an outer shell of the motor by providing the frame end part 31, and absorbs heat generated by the electronic components 41 or the like by the heat receiving part 32 when those components 41 receive an electric power.

The heat sink 30 has a concave portion 33 indenting from a substrate side to a motor side. The connector 50 is positioned in the concave portion 33. The heat receiving part 32 is positioned at a radius inside relative to the concave portion 33. An end face 321 of the heat receiving part 32, which faces the substrate 40, is in parallel with the substrate 40, and is also in parallel with the electronic components 41 Implemented on a heat sink side surface of the substrate 40, and adjoins or contacts the electronic components 41.

Figure 6:
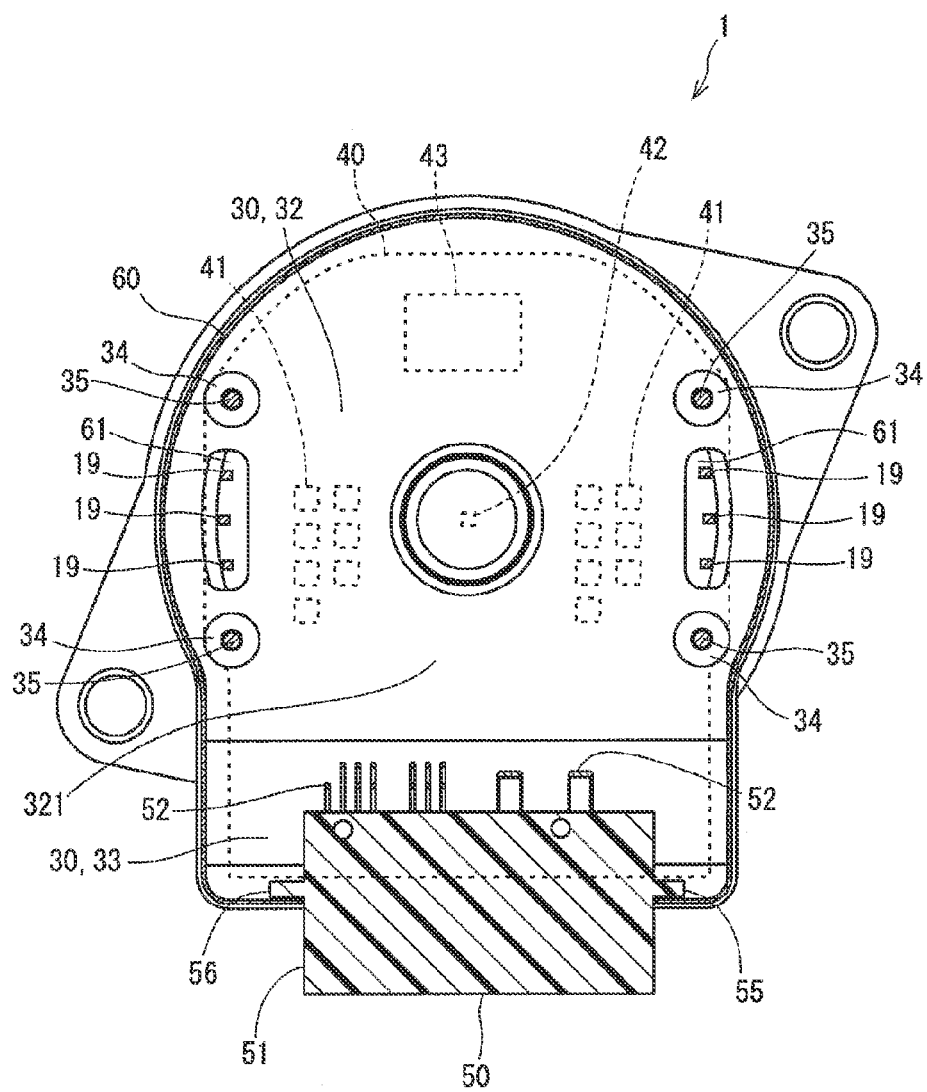
FIG. 6 is a sectional view of the drive device along a VI-VI line in FIG. 5.

Thereby, the heat sink 30 can reserve a large heat capacity without creating an excess unoccupied space in the cover 60. As shown in FIGS. 3 and 6, the heat sink 30 has a hole-like space 61 for a connection of a motor line 19 through the heat sink 30, i.e., for the motor line 19 to pass the heat sink 30 for connecting the coil 14 of the motor 10 and the substrate 40. The motor line 19 passes through the space 61 from the motor side, and pierces a through hole of the substrate 40, and protrudes from an outer face of the substrate 40. In this case, the outer face of the substrate 40 is a surface of the substrate looking away from the motor 10.

The drive device 1 of the present embodiment is provided with only one substrate 40. As shown in FIG. 3 to FIG. 6, the substrate 40 is, for example, a multilayer printed board 40, and is fixed to the heat sink 30 with four screws 35 respectively screwed in a tapped hole that is bored in a supporter 34 of the heat sink 30. The substrate 40 is perpendicularly disposed relative to the motor shaft O (refer to FIG. 5).

The heat sink side surface of the substrate 40 bears the following components. That is, the electronic components 41 that have switching elements, e.g. Metal Oxide Semiconductor Field Effect Transistor (MOSFET), for example, a rotational angle sensor 42 that detects the position of the rotor 12, and an integrated circuit 43 for a control of an electric power supply to the coil according to the position of the rotor 12 are mounted on the heat sink side of the substrate 40. Further, in FIG. 6, a dashed line shows an example of the electronic components 41, the rotational angle sensor 42 and the integrated circuit 43 mounted on the heat sink side of the substrate 40, as well as the substrate 40 itself.

The electronic components 41, the rotational angle sensor 42, and the integrated circuit 43 mounted on the heat sink side of the substrate 40 respectively have a flat shape, i.e., the width and the length of them longer than their heights that is measured along a motor shaft direction. Further, the integrated circuit 43 and the electronic components 41 respectively generate relatively large amount of heat when an electric power is supplied thereto.

The electronic components 41 mounted on the heat sink side of the substrate 40 and the heat sink 30 are separated by an insulated heat dissipation material which is not illustrated in the drawing. The Insulated heat dissipation material is a heat dissipation gel (i.e., may also be designated as a "heat dissipation grease") or a heat dissipation sheet, for example, and prevents air to interpose between the electronic components 41 and the heat sink 30, thereby improving thermal conductivity between them.

The electronic components 41 mounted on the substrate 40 function either as a three-phase inverter circuit for supplying an electric power to the motor 10 or a power switch for intercepting an electric power supplied from the connector 50 to the three-phase inverter circuit. The three-phase inverter circuit supplies an electric power to the coil 14 of the motor 10 according to the instruction from a microcomputer 46.

The surface of the substrate 40 looking away from the heat sink 30 bears other components, such as a capacitor 44, a choke coil 45, and the microcomputer 46, for example. The capacitor 44 and the choke coil 45 make up a filter circuit. Further, the capacitor 44 assists the electric power supply to the inverter circuit. Each of the capacitor 44 and the choke coil 45 has a greater height along the motor shaft direction in comparison to the electronic components 41 having a switching element. Further, the capacitor 44 and the choke coil 45 generate relatively small amount of heat when receiving the electric power supply as compared with the electronic components 41 having a switching element. Thus, almost all electronic components for controlling the electric current supply to the motor 10 are mounted on one substrate 40, either on the heat sink side or on the other side of the substrate 40.

The cover 60 is formed in a bottom-closed cylinder shape, and covers the substrate 40 and the heat sink 30. The cover 60, i.e., at its edge 62, overlaps with an outside of the frame end part 31 of the heat sink 30.

As shown in FIG. 3 to FIG. 6, the connector 50 is attached to the motor side of the substrate 40, and is positioned in the concave portion 33 of the heat sink 30. The connector 50 is an electronic component having a large volume among the electronic components 41 that make up the controller 20 compared with the capacitor 44, the choke coil 45 and the like. By positioning the connector 50 on the motor side of the substrate 40 and in the concave portion 33 of the heat sink 30, the dimension of the controller 20 along the motor shaft direction is reduced without creating excess unoccupied space in the cover 60.

The connector 50 has a connector body 51, multiple terminals 52, an upper flange 53, a lower flange 54, a right flange 55, and a left flange 56.

The connector body 51 extends from an inside of the cover 60 toward an outside thereof. Further, the connector body 51 has an opening 57 to which an external terminal is connectable. The opening 57 is positioned on a radial outside of the connector body 51, i.e., on an outer part of the connector body 51, relative to the motor shaft O. Also, the opening 57 faces outward relative to, or outward from the motor shaft O. An end face of the connector body 51 facing the motor 10 is separated from the bottom of the concave portion 33 of the heat sink 30 by a small gap space. The gap space between the end face of the connector body 51 and the bottom of the concave portion 33 of the heat sink 30 is designated as an air flow space 58.

The multiple terminals 52 are molded by the connector body 51, and both ends of respective terminals 52 are exposed from the connector body 51. That is, one end of a terminal 52 is exposed in the opening 57 of the connector body 51, and the other end of the same terminal 52 protrudes from the connector body 51 on an opposite side of the opening 57, toward the heat receiving part 32, and then toward an upper direction in terms of gravity wise, to be connected to the substrate 40. Further, each of those terminals 52 pierces a through hole of the substrate 40 to protrude from the away side of the motor 10. Therefore, each of those terminals 52 are soldered at the same time with the motor lines 19 protruding from the terminals 52.

From the external terminal that is connected to the opening 57 of the connector body 51, the terminals 52 receive an electric current to be supplied from a battery to the motor 10, a signal from the torque sensor 5, a signal of travel speed information, and the like. The terminals 52 transmit those electric current and signals to an electronic circuit provided on the substrate 40.

The periphery of the connector body 51 has flanges, i.e., the upper flange 53 prolonged away from the motor 10 as a part of the connector body 51, the lower flange 54 prolonged toward the motor 10 as a part of the connector body 51, and the right flange 55 and the left flange 56 which connect the upper flange 53 and the lower flange 54.

In FIG. 4, for the ease of understanding, the cover 60 is shown in a partially-cut manner on the left side, with hidden components under the cover 60 on the right side drawn with a broken line.

As shown in FIG. 4, the upper flange 53, the right flange 55, and the left flange 56 are formed inside the cover 60. On the other hand, the lower flange 54 is exposed to the open air from the cover 60.

The upper flange 53, the right flange 55 and the left flange 56 are either positioned very close to an inner surface of the cover 60, i.e., with only a small gap interposed between the flanges and the cover 60, or are abutted to the inner surface of the cover 60. In such manner, the water from outside of the cover 60 is prevented from intruding into an inside of the cover 60 via a labyrinth path that is formed between those flanges and the inner surface of the cover 60. Further, even when water has intruded into an Inside of the cover 60, the water is discharged from a portion 541 of the lower flange 54 which is exposed from the cover 60, or from an opening 542 that is positioned on a lower side of the labyrinth path with a help of the gravity.

The first embodiment of the present disclosure provides the following effects.

(1) According to the first embodiment, the drive device 1 has a large size electronic component 41, i.e., the connector 50, of the controller 20 positioned on the motor side of the substrate 40. The heat sink 30 in the controller 20 has a one-body structure, combining the frame end part 31 that covers the substrate facing side of the motor 10 and the heat receiving part 32 that extends from the frame end part 31 at a radial inside position of the connector 50 into one body. Here, "radial inside" means that the heat receiving part 32 extends within an area defined by a radius from the motor shaft O to the connector 50, when viewed at a direction through of the motor shaft O, or in an axial direction of the motor 10. Therefore, no excess unoccupied space is created inside the cover 60 that covers the substrate 40 in a bottom-closed cylinder shape, while achieving a smaller along-the-motor-shaft dimension of the drive device 1.

Further, by closely positioning the away-from-motor end face 321 of the heat receiving part 32 to the substrate 40, the drive device 1 acquires a large heat capacity for the heat sink 30, and heat from the heat generating components 41 on the substrate 40 is easily dissipated. Therefore, the drive device 1 is enabled to supply a large electric current to the electronic components 41 mounted on the substrate 40.

(2) According to the first embodiment, the heat sink 30 has the concave portion 33 indented from the substrate side to the motor side. The connector 50 is positioned in the concave portion 33 of the heat sink 30. Thereby, the drive device 1 is enabled to have a smaller along-the-motor-shaft dimension.

(3) According to the first embodiment, the end face of the heat receiving part 32 of the heat sink 30 facing the electronic components 41 is in parallel with the substrate 40. The electronic components 41 mounted on the substrate 40 and facing on the heat receiving part 32 are interposed with the insulated heat dissipation material from the heat receiving part 32 of the heat sink 30.

Therefore, the gap between the electronic components 41 and the heat receiving part 32 is reduced to a small dimension, for enabling the drive device 1 to have a smaller volume. Further, heat conductivity between the electronic components 41 and the heat sink 30 is improved by providing the insulated heat dissipation material in such gap space.

(4) According to the first embodiment, the terminals 52 of the connector 50 respectively have one end exposed from the opening 57 of the connector body 51, and have the other end protruding from the other side of the connector body 51 relative to the opening 57 to extend upward and to be connected to the substrate 40.

In such manner, even when water intrudes into the inside of the cover 60 from outside, the gravity pull toward the vertical downward prevents the water from being carried toward the above-positioned substrate 40 along the terminals 52.

(5) According to the first embodiment, the upper flange 53, the right flange 55, and the left flange 56 of the connector 50 are positioned in an inside of the cover 60. The lower flange 54 of the connector 50 is exposed to the open air from the cover 60.

Therefore, the gap between the upper flange 53, the right flange 55, the left flange 56 and the cover 60 is formed as the labyrinth path. The labyrinth path of the drive device 1 prevents the water from intruding into an inside of the cover from outside.

Further, even when the water has intruded into the labyrinth path, the water is discharged from the part 541 of the lower flange 54 exposed from the cover 60 or from the opening 542 of the labyrinth path positioned at the lower part that utilize gravity pull.

(6) According to the first embodiment, the air flow space 58 is formed between the end face of the connector body 51 facing the motor 10 and the bottom of the concave portion 33 of the heat sink 30.

In such manner, even when water intrudes into the inside of the cover 60 from outside, the water is prevented from being kept between the connector body 51 and the heat sink 30, and is discharge to the outside of the cover 60.

(7) According to the first embodiment, the electronic components 41 having a switching element are mounted on the heat sink side of the substrate 40, and other electronic components 44 and 45, which has a larger along-the-motor-shaft dimension than the components 41, are mounted on the other side of the substrate 40, i.e., on a surface facing away from the heat sink 30.

In such manner, the heat sink side of the substrate 40 does not have any tall electronic components, such as the components 44 and 45, which allows the heat sink 30 to have a larger volume, i.e., a larger heat capacity, because the height of the heat sink 30 is increasable up to the height of the connector 50. Therefore, by increasing the heat capacity of the heat sink 30, the electronic components 41 is enabled to have a larger electric power supply, which leads to an increased output of the motor 10.

(8) According to the first embodiment, the motor line 19 pierces through a through hole of the substrate 40 to protrude from the away side of the substrate 40 relative to the motor 10. Further, the terminals 52 of the connector 50 extend from the connector body 51 on an opposite side of the opening 57 to be connected to the substrate 40 and to protrude from the away side of the substrate 40 through the through hole of the substrate 40.

In such manner, the motor line 19 and the terminals 52 are soldered to an electronic circuit on the substrate 40 at the same time from the same side of the substrate 40. Thus, the workability of the manufacturing process for manufacturing the controller 20 is improved.

(9) The electric power steering device 2 of the first embodiment has an improved installability in the vehicle based on the smaller volume and dimension of the drive device 1 along the motor shaft direction.

Second Embodiment

Figure 7:
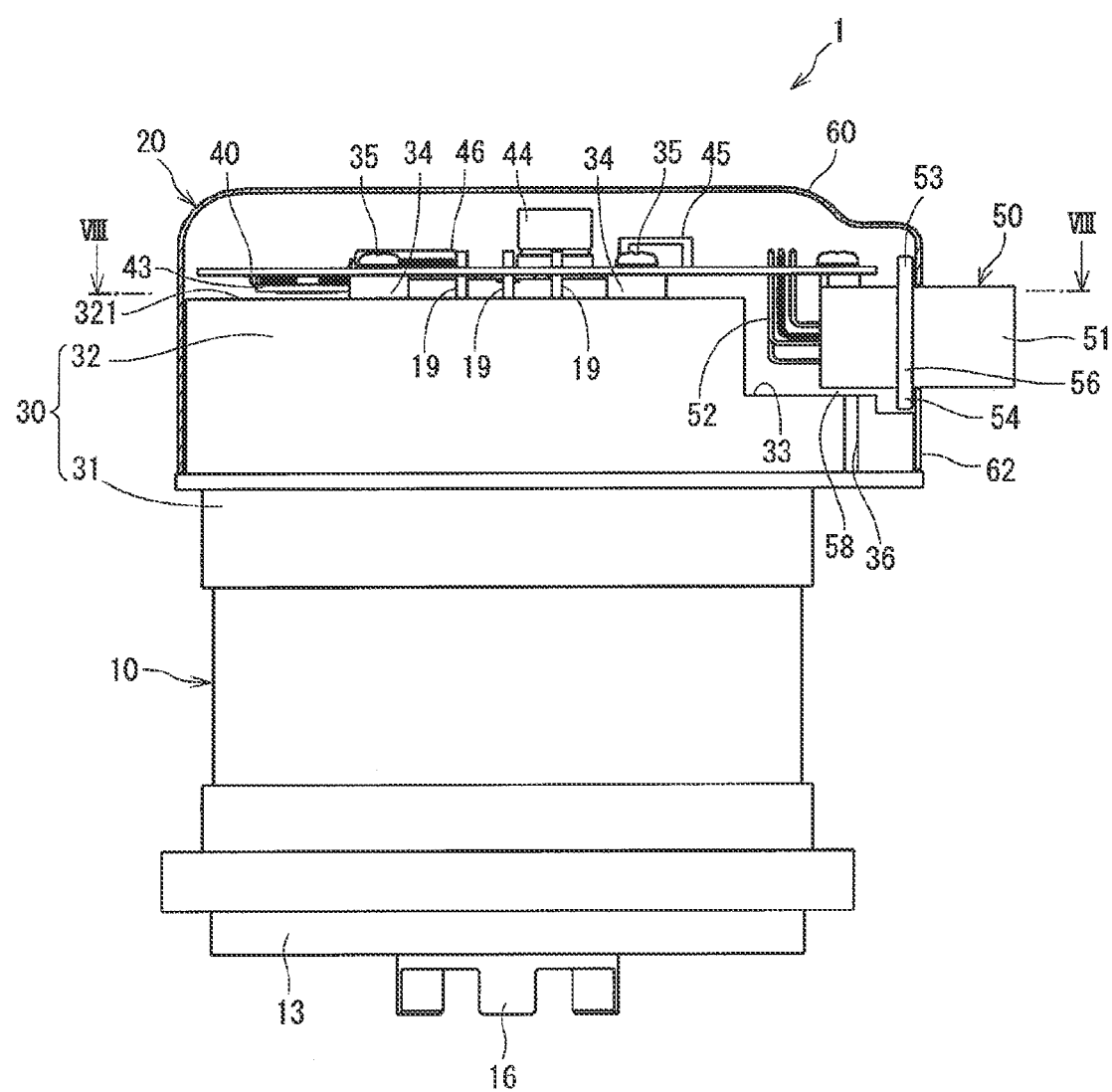
FIG. 7 is a side view of the drive device in a second embodiment of the present disclosure, in which a part of the cover is removed from the drive device.
Figure 8:
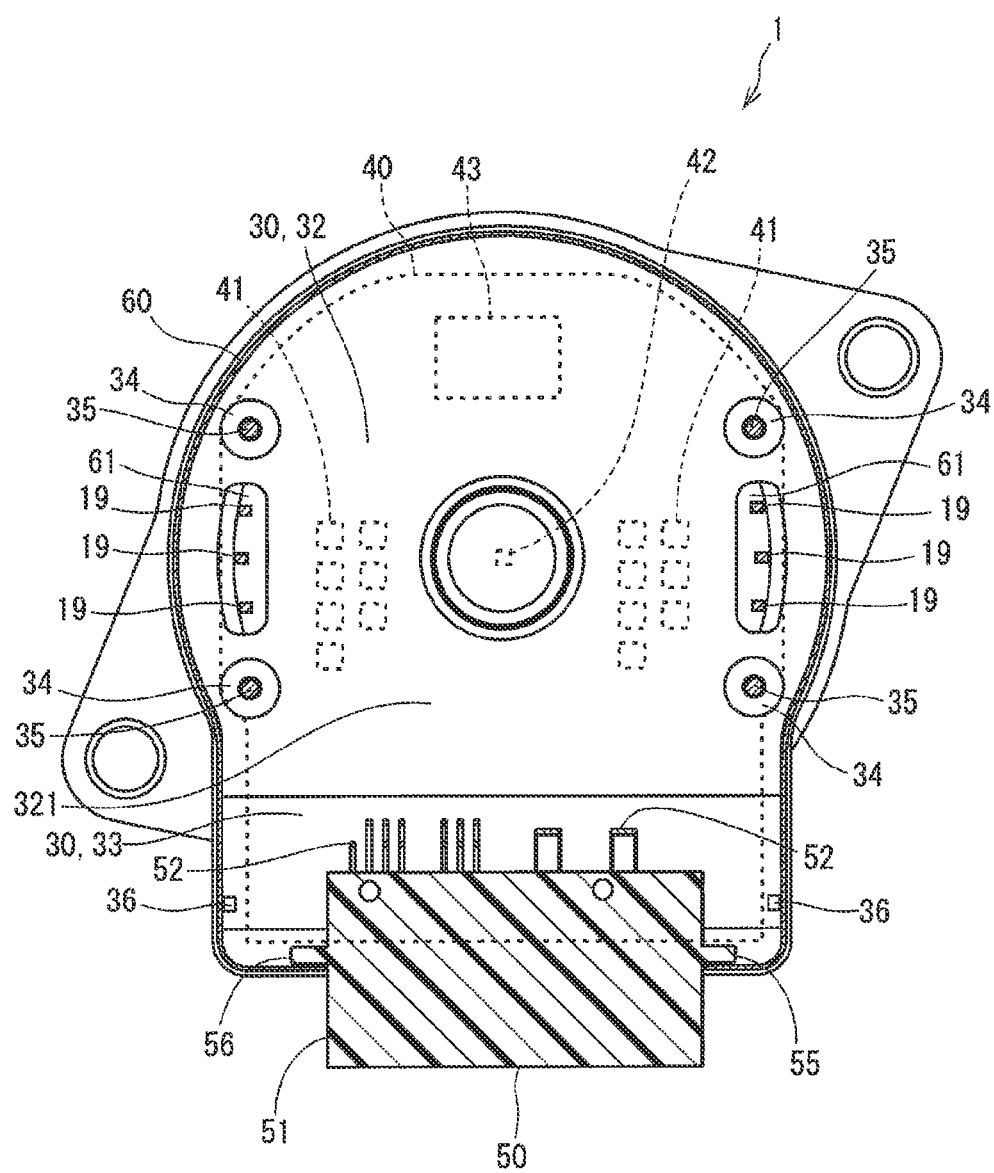
FIG. 8 is a sectional view of the drive device along a VIII-VIII line in FIG. 7.

The second embodiment of the present disclosure is shown in FIGS. 7 and 8. The same numerals as the first embodiment are used to represent the same components as the first embodiment, for the brevity of the description.

According to the second embodiment, the heat sink 30 has a slit 36 allowing communication between the open air and the bottom of the concave portion 33 of the heat sink 30, at a position on an outer wall of the frame end part 31. The slit 36 may also be formed at other position in an inside of the cover 60, as long as it allows communication between the open air and the bottom of the concave portion 33 of the heat sink 30, and the shape and the number of the slit 36 may be arbitrarily defined.

According to the second embodiment, even when water intrudes into the inside of the cover 60 from the outside, the water can be discharged to the outside through the slit 36 from the air flow space 58 that is formed in the gap space between the end face of the connector body 51 facing the motor 10 and the bottom of the concave portion 33 of the heat sink 30.

Other Embodiments

In the embodiment mentioned above, the drive device 1 is described as a "column assist" type drive device in the electric power steering device 2, which assists a rotation of the column shat 4. In other embodiments, the drive device 1 in the electric power steering device 2 may be a "rack assist" type drive device, which assists a translational movement of the rack shaft 8.

In the embodiment mentioned above, the motor 10 of the drive device 1 is a brushless motor, and the electronic components 41 having a switching element that is used in the controller 20 is described as a component of the three-phase inverter circuit or the like that supplies an electric power to the brushless motor.

On the other hand, in other embodiments, the motor 10 of the drive device 1 may be a motor with a brush, for example, and the electronic components 41 in such case may be a component of an H bridge circuit that supplies an electric power to that motor 10.

The embodiment mentioned above describes the drive device 1 used in the electric power steering device 2.

On the other hand, in other embodiments, the drive device 1 may be applied to various devices other than the electric power steering device 2.

The embodiment mentioned above describes the motor 10 of the drive device 1 functioning as an electric motor. However, the motor 10 of the drive device 1 in other embodiment may be functioning as a generator.

Although the present disclosure has been described in connection with preferred embodiment thereof with reference to the accompanying drawings, it is to be noted that various changes and modifications will become apparent to those skilled in the art, and such changes, modifications, and summarized scheme are to be understood as being within the scope of the present disclosure as defined by appended claims.

What is claimed is:

1. A drive device comprising:
  a motor having a rotor that is rotatably disposed relative to a stator;
  a cover having a one-end-closed cylinder shape and positioned on one axial end side of the motor;
  a substrate disposed inside of the cover perpendicular to a motor shaft having electronic components implemented on the substrate to control an electric current supplied to the motor;

a connector positioned on a motor side of the substrate with an opening that is connectable to an external terminal, the opening of the connector facing outward relative to the motor shaft; and a heat sink having a frame end part and a heat receiving part formed in one body to absorb heat from the electronic components implemented on the substrate, the frame end part covering a substrate side of the stator and the rotor, and the heat receiving part positioned radial inside of the connector, relative to the motor shaft, when viewed at a direction through the motor shaft, and rising from the frame end part toward the substrate, when viewed at an other direction perpendicular to the motor shaft.

2. The drive device of claim 1, wherein the heat sink has a concave portion having a concave shaped indent from a substrate side to a motor side, and the connector is positioned in the concave portion of the heat sink.

3. The drive device of claim 1, wherein the heat receiving part of the heat sink has an end face that faces the electronic components, and the end face is disposed in parallel with the substrate.

4. The drive device of claim 1, wherein the connector comprises a connector body having the opening that is connectable to the external terminal and a terminal extending from a side of the connector body opposite of the opening, extending away from the connector body toward the substrate and connecting to the substrate.

5. The drive device of claim 1, wherein the connector comprises a connector body having the opening that is connectable to the external terminal, an upper flange extending away from the connector body relative to the motor, a lower flange extending toward the motor, and a right flange and a left flange connecting the upper flange and the lower flange, the upper flange and the lower flange are disposed inside of the cover, and the lower flange is exposed from the cover to an ambient air.

6. The drive device of claim 4, wherein an air flow space is defined at a position between a motor side end face of the connector body and a bottom face of a concave portion of the heat sink.

7. The drive device of claim 1, wherein the frame end part has a slit on an outer wall facing a radial outside of the frame end part, the slit letting the ambient air to be introduced to a bottom face of a concave portion of the heat sink.

8. The drive device of claim 1, wherein the substrate has a first face facing the heat sink on which an electronic component having a switching element is implemented, and the substrate has a second face facing away from the heat sink on which an other electronic component is implemented, the other electronic component having a greater along-motor-shaft dimension than the electronic component having the switching element.

9. The drive device of claim 4, wherein a motor line supplying an electric current from the substrate to the motor pierces the substrate to protrude from an outer face facing away from the heat sink, and the terminal of the connector extends away from the connector body relative to the opening to be connected to the substrate, and further to piercingly protrude from the outer face of the substrate.

10. An electric power steering device comprising:

a power transmission mechanism transmitting power between a steering wheel and a steered wheel; and a drive device comprising:

a motor having a rotor that is rotatably disposed relative to a stator;

a cover having a one-end-closed cylinder shape and positioned on one axial end side of the motor;

a substrate disposed inside of the cover perpendicular to a motor shaft having electronic components implemented on the substrate to control an electric current supplied to the motor;

a connector positioned on a motor side of the substrate with an opening that is connectable to an external terminal, the opening of the connector facing outward relative to the motor shaft; and a heat sink having a frame end part and a heat receiving part formed in one body to absorb heat from the electronic components implemented on the substrate, the frame end part covering a substrate side of the stator and the rotor, and the heat receiving part positioned radial Inside of the connector, relative to the motor shaft, when viewed at a direction through the motor shaft, and rising from the frame end part toward the substrate, when viewed at an other direction perpendicular to the motor shaft, the drive device outputting a steering assist torque from the motor to the power transmission mechanism.

* * * * *